Sept. 9, 1969   J. F. KING   3,466,058
TORSION SPRING SUSPENSION SYSTEM FOR VEHICLES
Filed Nov. 24, 1967   2 Sheets-Sheet 2
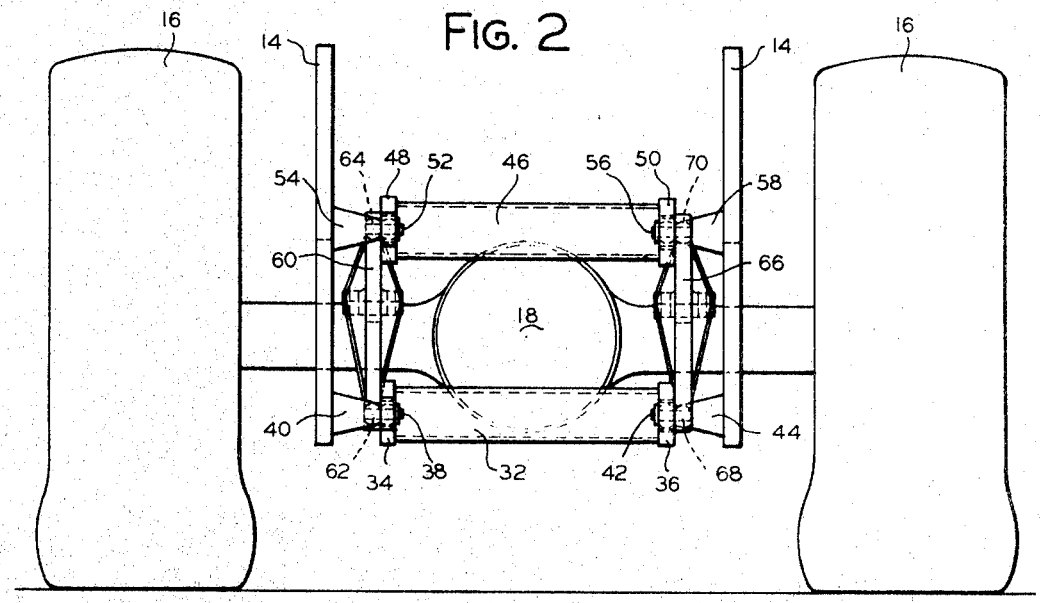
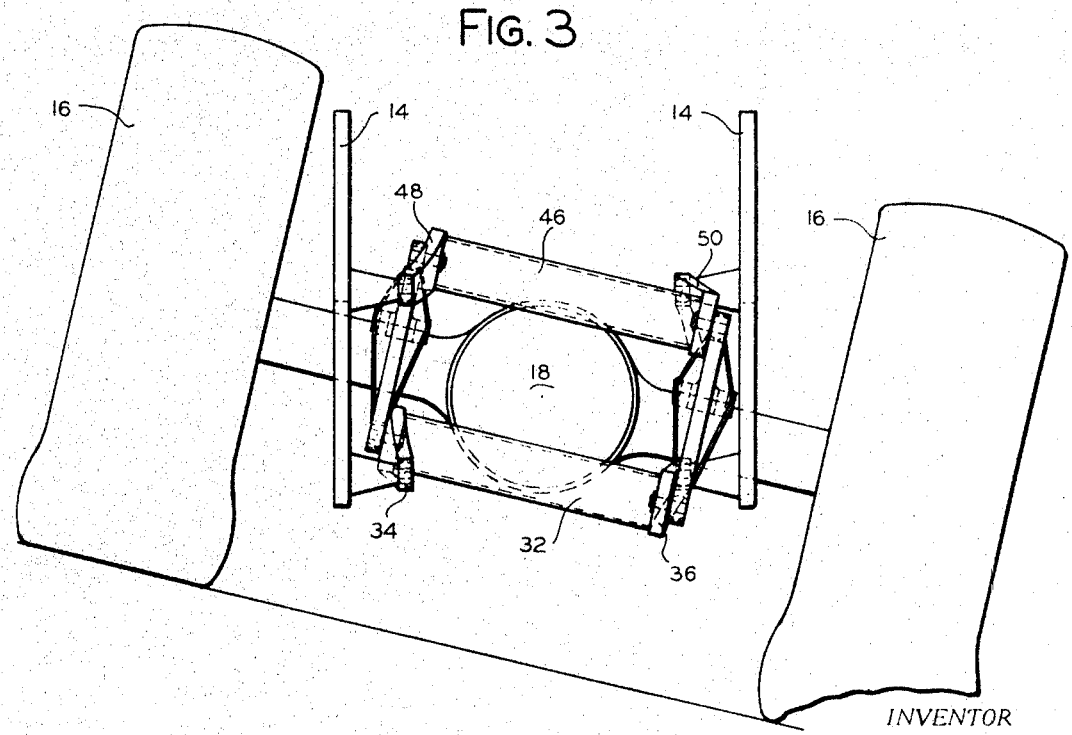
INVENTOR
JAMES F. KING
BY Robert H. Johnson
ATTORNEY

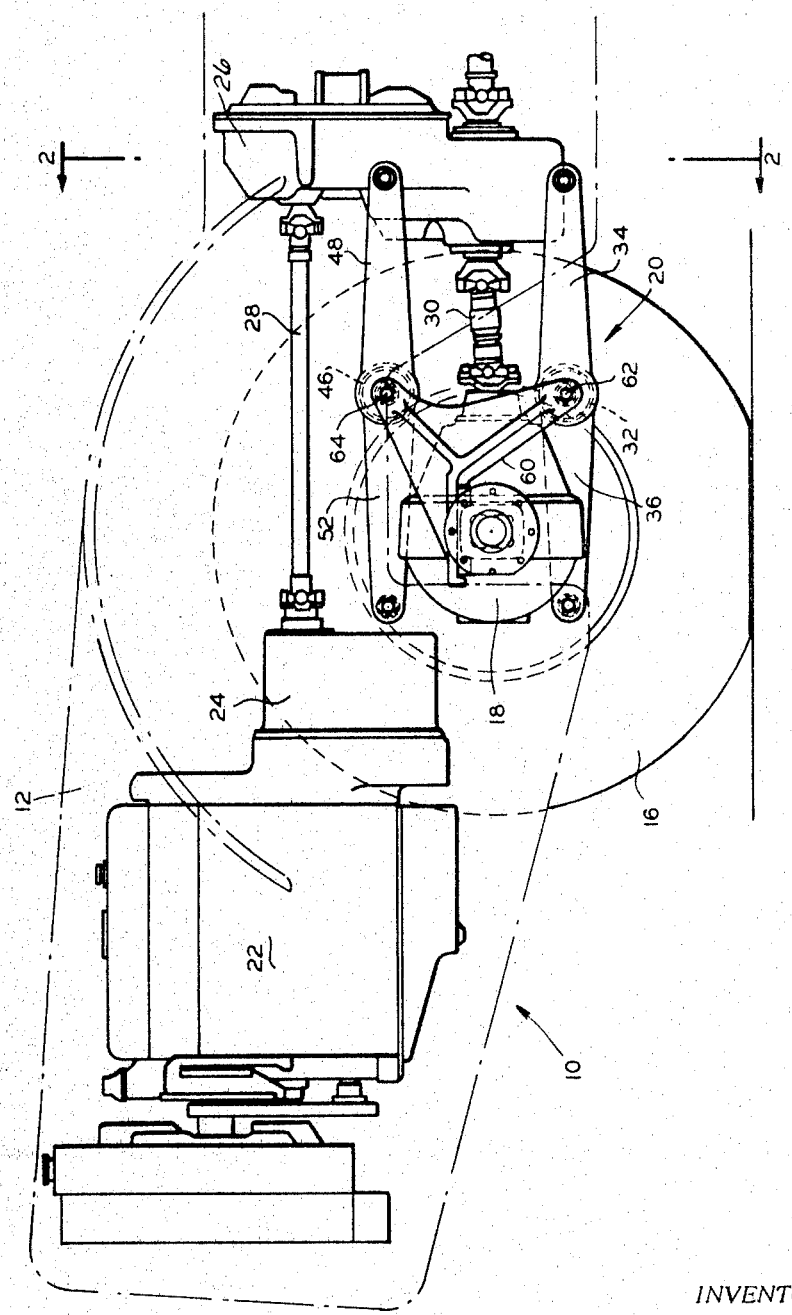

United States Patent Office 3,466,058
Patented Sept. 9, 1969

3,466,058
TORSION SPRING SUSPENSION SYSTEM FOR VEHICLES
James F. King, St. Joseph, Mich., assignor to Clark Equipment Company, a corporation of Delaware
Filed Nov. 24, 1967, Ser. No. 685,396
Int. Cl. B60g 11/20; F16f 1/16
U.S. Cl. 280—124                                2 Claims

ABSTRACT OF THE DISCLOSURE

A suspension system connecting an axle to a vehicle frame for vertical movement and pivotal movement about a horizontal longitudinal extending axis.

Background of the invention

The field of art to which the invention pertains includes spring devices, and more specifically torsion spring suspensions for vehicles.

A principal object of my invention is to provide a simple low cost vehicle suspension which permits vertical movement of the axle and also pivotal movement about a longitudinally extending horizontal axis.

Summary of the invention

In carrying out my invention in a preferred embodiment thereof, I provide a pair of torsion members to each of which are fixed oppositely extending arms that are pivotally connected to a vehicle frame. An axle mounting member is pivotally connected to the torsion members.

The above and other objects, features and advantages of my invention will be more readily understood by persons skilled in the art when the following detailed description is taken in conjunction with the drawing.

Brief description of the drawing

FIGURE 1 is a side elevation showing to advantage my invention in conjunction with a portion of a vehicle;

FIGURE 2 is a simplified end view of my invention; and

FIGURE 3 is similar to FIG. 2, except the axle has been pivoted about a longitudinally extending horizontal axis.

Description of the preferred embodiment

Referring now to the drawing, the reference numeral 10 denotes generally a portion of a vehicle which includes a body 12 carried on a frame 14 (see FIGS. 2 and 3). The portion of vehicle 10 that is shown is supported by a pair of wheels 16 which are connected to the outer ends of a drive axle 18 which in turn is connected to vehicle 10 for reciprocal vertical movement and pivotal movement about a longitudinally extending horizontal axis by a suspension system 20.

Vehicle 10 carries an internal combustion engine 22 to which a hydrodynamic torque converter 24 is connected. The output of torque converter 24 is transmitted to a multi-speed gear transmission 26 via a drive shaft 28 and part of the power output from transmission 26 is transmitted to drive axle 18 by a drive shaft 30.

Suspension system 20 includes a torsion member or torque tube 32 disposed generally horizontally and transversely of the longitudinally extending axis of vehicle 10. Fixed to opposite ends of torsion member 32 is a pair of arms 34 and 36 which are disposed to extend in substantially opposite directions from each other and normally are generally horizontal. Arm 34 is pivotally connected at 38 to inwardly extending bracket 40 fixed to frame 14 by any suitable means, such as welding. Similarly, arm 36 is pivotally connected at 42 to an inwardly extending bracket 44 fixed to frame 14.

Another torsion member or torque tube 46 is located generally directly above torsion member 32 and likewise is disposed substantially horizontal and transversely of vehicle 10. Connected to opposite ends of torsion member 42 is a pair of generally oppositely extending arms 48 and 50. Arms 48 and 50 are disposed generally horizontal normally and extend longitudinally of the vehicle 10. Arm 48 is pivotally connected at 52 to an inwardly extending bracket 54 fixed to frame 14. Similarly, arm 50 is pivotally connected at 56 to an inwardly extending bracket 58 which is fixed to frame 14.

Suspension system 20 also includes an axle mounting member 60 which is pivotally connected to adjacent ends of torsion members 42 and 46 at 62 and 64 and an axle mounting member 66 which is pivotally connected to the ends of torsion members 32 and 46 opposite axle mounting member 60 at 68 and 70. Axle 18 is connected to axle mounting members 60 and 66 by any suitable means, such as bolting.

In order to enable persons skilled in the art to better understand my invention, I will now explain the operation of it. It will be assumed that an upward force is applied to axle 18 equally through both wheels 16. As axle 18 starts to move upwardly a clockwise torque is applied to adjacent ends of torsion members 32 and 46 through arms 34 and 48, as viewed in FIG. 1. At the same time a counterclockwise torque is being applied to the other ends of torsion members 32 and 46 by arms 36 and 52. As a result, upward vertical movement of axle 18 is resisted by torsion members 32 and 46.

If axle 18 is pivoted about a horizontal longitudinally extending axis as shown in FIG. 3, then arms 34 and 48 tend to rotate the ends of torsions tubes 32 and 46 to which they are respectively connected in a clockwise direction, as viewed in FIG. 1. At the same time arms 36 and 52 also tend to rotate the ends of torsion tubes 32 and 46 to which they are respectively connected in a clockwise direction. Therefore, no torsion or twist is being applied to torsion members 32 and 46, and so there is no resistance by the torsion members to pivotal movement about a centrally disposed longitudinally extending horizontal axis. Of course, axle 18 may pivot about a longitudinally extending horizontal axis which is not centrally disposed between the ends of torsion tubes 32 and 46, and so there will be some twisting applied to torque tubes 32 and 46 as described above in regard to only a vertical movement of axle 18.

While I have described only a single preferred embodiment of my invention, it will be understood that it is intended for purposes of illustration only, and that my invention is subject to various modifications and changes which would fall within the scope and spirit of my invention. For example, either the upper torsion member 46 or the lower torsion member 32 may be entirely eliminated from suspension 20 without changing the operation of it. The arms which then are no longer connected to a torsion member function merely as stabilizing links.

I claim:
1. For use with a vehicle having an elongated frame, a suspension system comprising a torsion member disposed substantially transversely of the vehicle, first and second arms fixed to the said torsion member in spaced relation to each other and pivotally connected to the frame, the said first and second arms extending in substantially opposite directions relative to each other and longitudinally of the vehicle, axle mounting means pivotally connected to the said torsion member, and at least one stabilizing link pivotally connected to the said axle mounting means and the frame.

2. For use with a vehicle having an elongated frame, a suspension system comprising a first torsion member disposed substantially transversely of the vehicle, first and second spaced apart arms fixed to the said first torsion member and pivotally connected to the frame, the said arms being disposed to extend in substantially opposite directions from each other and longitudinally of the vehicle, a second torsion member disposed substantially transversely of the vehicle, third and fourth spaced apart arms fixed to the said second torsion member and pivotally connected to the frame, the said third and fourth arms being disposed to extend in substantially opposite directions from each other and longitudinally of the vehicle, and axle mounting means pivotally connected to both torsion members.

References Cited

UNITED STATES PATENTS 3,013,808  12/1961  Willetts _____ 267—57 X
3,371,940  3/1968  Sinclair et al. _____ 267—57 X A. HARRY LEVY, Primary Examiner U.S. Cl. X.R.

180—73; 267—57